United States Patent [19]

Borsuk et al.

[11] Patent Number: 4,854,663
[45] Date of Patent: Aug. 8, 1989

[54] LENSED OPTIC FIBER TERMINUS AND METHOD

[75] Inventors: Leslie M. Borsuk, Los Alamitos; Bruce Coutts, Costa Mesa, both of Calif.

[73] Assignee: ITT Corporation, New York, N.Y.

[21] Appl. No.: 142,650

[22] Filed: Jan. 11, 1988

Related U.S. Application Data

[63] Continuation-in-part of Ser. No. 937,573, Dec. 4, 1986, abandoned.

[51] Int. Cl.⁴ .............................................. G02B 7/26
[52] U.S. Cl. .................................................. 350/96.20
[58] Field of Search ............... 350/96.18, 96.20, 96.21, 350/96.22

[56] References Cited

U.S. PATENT DOCUMENTS

| | | | |
|---|---|---|---|
| 4,087,155 | 5/1978 | Deacon | 350/96.21 |
| 4,191,447 | 3/1980 | Borsuk | 96.20/350 |
| 4,461,539 | 7/1984 | Bailey et al. | 350/96.21 |
| 4,497,536 | 2/1985 | Payne et al. | 350/96.21 |

FOREIGN PATENT DOCUMENTS 58-102911  6/1983  Japan ................................. 350/96.20

OTHER PUBLICATIONS

"A Fiber Optic Interconnect System For Military Severe Environments", Electronic Connector Study Group, Inc., R. E. Ellis, T. E. Giles, Frank H. Levinson, D. R. Roberts, R. Schlingensiepen, P. Soni, pp. 168-175.

*Primary Examiner*—Frank Gonzalez
*Attorney, Agent, or Firm*—Thomas L. Peterson

[57] ABSTRACT

An optic fiber connection apparatus and method are provided which enables positioning of a lens or bead at the end of an optic fiber at a selected distance from the end of the contact or terminus while maintaining a closely controlled lateral position of the bead. The contact has a hole extending along its axis, with a cylindrical front portion of a diameter to closely surround the lens at the end of the optic fiber. In addition or alternatively, the hole that receives the fiber may have a diameter to closely surround the fiber, and a shoulder intermediate the contact front and rear end. The optic fiber can be slid within the contact to extend its end beyond the contact so a lens can be formed on the tip of the fiber. Thereafter the fiber is slid backward into the contact. The lens is slid backward or foward against a positioning tool to a final lens position forward of the shoulder.

6 Claims, 2 Drawing Sheets

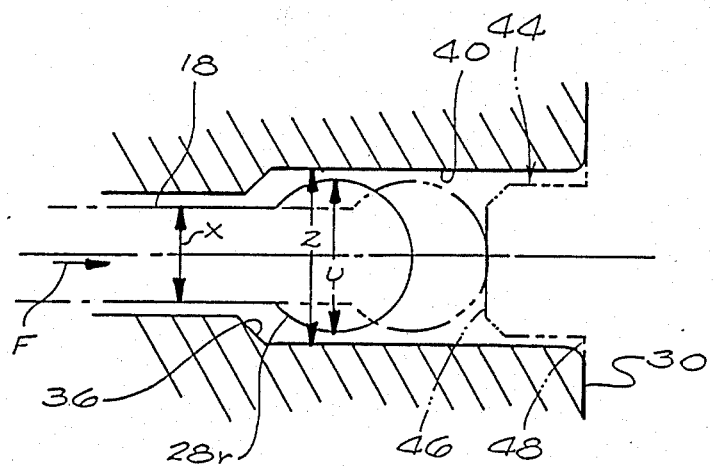
FIG. 4
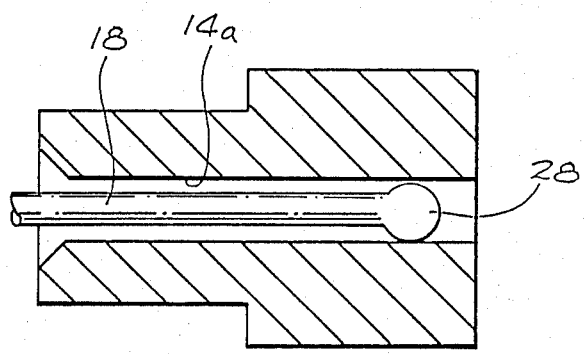
FIG. 5
FIG. 6
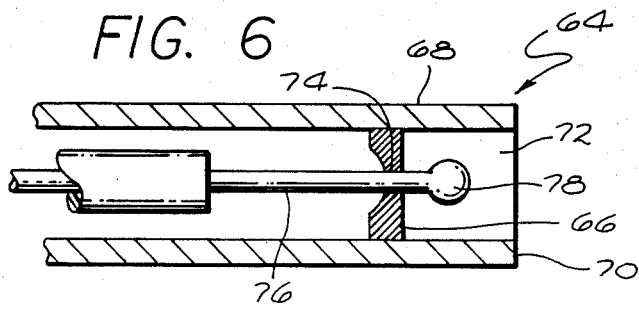

LENSED OPTIC FIBER TERMINUS AND METHOD

CROSS-REFERENCE TO RELATED APPLICATION

This application is a continuation-in-part of application Serial No. 937,573 (abandoned), filed Dec. 4, 1986, entitled "Lensed Optic Fiber Terminus."

BACKGROUND OF THE INVENTION

A pair of optic fibers can be optically coupled by forming lenses at the ends of the optic fibers and positioning the lenses substantially in alignment and at approximately a predetermined spacing. One technique for accomplishing this, as disclosed in U.S. Pat. No. 4,497,536, is to extend the tip of the fiber beyond the front of a contact or terminus and apply heat to form the bead or lens thereon. Then the fiber is pulled back until the root of the lens rests against a locating surface at the bottom of a recess at the front of the contact, which locates the lens both laterally and longitudinally. While this technique accurately locates the root of the lens, it has the disadvantage that the lens may be broken off as it is pulled back firmly to seat its root against the locating surface. This can occur because the optic fiber and lens have very small diameters and a small force can break off the lens at or near its root.

In a lens type fiber optic connector, it is critical that the front faces of the lenses in the mating fiber optic contacts be positioned a precise predetermined distance from each other to maximize light transmission through the optical fibers joined by the contacts in a connector. This requires that the front face of the lens in each contact be positioned a precise distance from the front mating face of the contact which is half the distance desired for the spacing between the lenses in the mated contacts to assure maximum light transmission. In the prior art contact of the type described above, the position of the front face of the lens in the contact is dependent upon three tolerances namely tolerances for the axial length of the bead lens, the position of the locating surface at the bottom of the recess against which the lens seats, and the shape and location of the root of the lens. Because there are three axial tolerances applicable to the two mating contacts in a connector, there is an accumulation of manufacturing tolerances which makes it extremely difficult to achieve the proper spacing between the end faces of the lenses in the contacts necessary to avoid attenuation of the light signal through the connector.

An object of the present invention is to provide a connection apparatus and method which enables the forming and positioning of a lens at the end of an optical fiber which avoids breakage caused by pulling the fiber until the lens rests firmly against a stop.

Another object of the invention is to provide a connection apparatus and method which permits precise positioning of the end face of an optical fiber lens within a contact so that light transmission through a pair of mating contacts may be maximized.

SUMMARY OF THE INVENTION

In accordance with one embodiment of the present invention, an optic fiber connection apparatus and method are provided which facilitates the forming and positioning of a lens on an optic fiber with respect to a contact. The contact has a hole extending along its axis for receiving the optic fiber. An enlarged front portion of the hole closely surrounds the lens formed on the front of the optic fiber or the contact hole closely surrounds the fiber or both. This permits the fiber to be slid backward into the contact to its final position at which the contact closely surrounds the lens or fiber, or both, to laterally position the lens in the contact. The lens is positioned in the contact by the use of a tool which avoids the need to pull the lens firmly against a stop in the contact, and assures precise positioning of the end face of the lens in the contact.

The novel features of the invention are set forth with particularity in the appended claims. The invention will be best understood from the following description when read in conjunction with the accompanying drawings.

BRIEF DESCRIPTION OF THE DRAWINGS

FIG. 4 is an enlarged view of a portion of FIG. 1, showing the manner in which the lens on the optic fiber can be accurately positioned according to one embodiment of the invention;

FIG. 5 is a partial sectional view of a contact and optic fiber constructed in accordance with another embodiment of the invention; and FIG. 6 is a partial sectional view of a contact and optic fiber constructed in accordance with a further embodiment of the invention.

DESCRIPTION OF THE PREFERRED EMBODIMENTS

Figure 1:
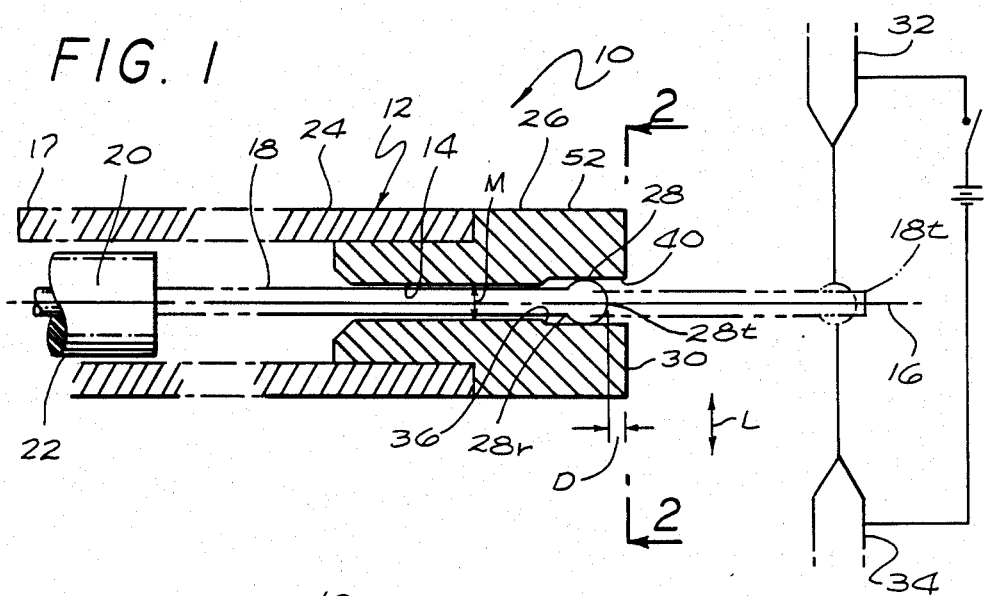
FIG. 1 is a sectional view of a contact of the present invention, showing the manner in which a lens is formed on an optic fiber.
Figure 2:
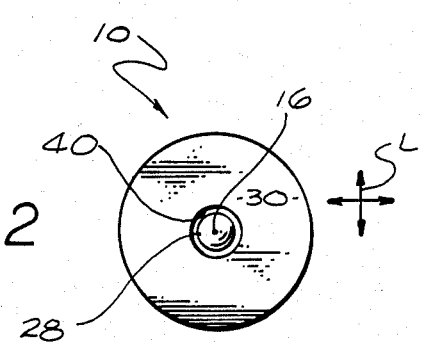
FIG. 2 is a view taken on the line 2—2 of FIG. 1.

FIG. 1 illustrates an optic fiber connection apparatus 10 which includes a terminus or contact 12 that has a longitudinal passage or hole 14 extending along its axis 16. The hole extends between rearward and forward ends 17, 30 of the contact, for receiving an optic fiber 18. The optic fiber is part of an optic fiber assembly 20 which includes a buffer 22 whose front end has been stripped off. The contact 12 includes a ferrule 24 and a bushing 26 mounted on the front end of the ferrule. The bushing may be formed of metal, plastic or ceramic. In order to effectively couple the front end of the optic fiber to another similar optic fiber, an enlargement in the form of a lens or bead 28 is formed at the front end of the fiber. This is accomplished by heating the fiber end until it melts with surface tension forming the melted end into a lens having a rounded and optically clear end. One method for heating the optic fiber end is to slide it forward until the tip 18$t$ of the optic fiber projects beyond the front end 30 of the contact. A pair of electrodes 32, 34 are positioned on opposite sides of the front end of the optic fiber. A voltage is applied between the electrodes to establish an arc between them that passes through the optic fiber to heat it. Such heating method has been found to produce nearly spherical lenses of diameters that are predictable within about 5%. For example, two common sizes of optic fibers have diameters X (FIG. 4) of 125 $\mu$m (micrometers) and 140 $\mu$m, and it has been found that beads can be formed on such optic fibers having a diameters Y of about 225 $\mu$m and 300 $\mu$m plus or minus 5 $\mu$m, respectively. After the lens has been formed, the optic fiber is slid rearwardly along the axis 16 (FIG. 1) until the front end of the optic fiber is located at a predetermined distance D rearward of the front end 30 of the contact.

In the prior art, the lens was located at its final position along the axis 16 (so it lay a distance D behind the front end of the contact) and along lateral directions L perpendicular to the axis by pulling the fiber. The fiber was pulled rearwardly until the root 28r of the lens rested firmly against a locating surface comparable to the intersection surface 36 which forms an intersection region between the rearward and forward hole portions. The fiber had to be pulled firmly to assure good seating against a locating surface, but if it were pulled slightly too hard, the lens would break off. Furthermore, with the lens firmly seated against a locating surface, there was a danger of lens break off caused by differential thermal expansion when the temperature rose.

Applicants locate the lens 28 at its final position by separately locating it in the lateral direction L and in the axial direction along the axis 16. The lens is laterally positioned on the axis 16 by forming the hole 14 so it has a front portion 40 that closely confines the lens 28. As mentioned above, applicants are able to form the lens to within about 5% of a desired diameter size. Applicants form the front hole portion 40 so it has a substantially constant cross section and has a width or diameter Z no more than about 10% greater than a nominal diameter Y of the lens and preferably no more than 5% greater to closely surround the lens to maintain its lateral position. While the particular front hole portion 40 is substantially cylindrical, it can have a variety of cross sections so long as it closely surrounds the lens. The position of the lens in the front portion 40 of the hole in the contact is established by a positioning tool shown at 44 in FIG. 4. The tool 44 includes a lens-engaging portion 46 which fits into the front hole portion 40 by moving it rearwardly from the front end of the contact, and it also includes a contact-abutting portion 48 that abuts the front end 30 of the contact. The distance between the intersection surface 36 and the lens-engaging portion 46 of the tool when the contact abutting portion 48 abuts the front end of the contact is greater than the axial extent or length of the lens 28 so that when the lens-engaging portion of the tool engages the lens in the contact, the lens will be spaced forward of the intersection surface 36.

The distance that the front face 28 of the lens is positioned behind the front end 30 of the contact is very precisely established by the use of the positioning tool 44 since only one manufacturing tolerance controls the positioning of the front face of the lens, namely, the distance between the lens engaging portion 46 of the tool and the contact abutting portion 48 thereof. This distance can be closely controlled by conventional machining techniques. Thus, by the present invention, two manufacturing tolerances are eliminated per contact as compared to the prior art contact described previously herein, thereby assuring that when mating contacts of the present invention are brought into axial abutment with each other, the front faces of the lenses in the contacts will be precisely positioned to minimize attenuation of light signals through the optical fibers connected to the contacts. Further, since one tool may be used to locate the lenses in many contacts, the lens location in a group of contacts does not vary from one contact to the other as occurs in the prior art arrangement wherein variances in the dimensions of the lenses and positions of the locating surfaces in the contacts results in the front faces of the lenses being positioned differently from one contact to the other.

The optic fiber can be readied for mounting by projecting the tip of the fiber, as shown in FIG. 1, at the position 18t, and then energizing the electrodes 32, 34 at a predetermined voltage and for a predetermined time period to form the lens. The optic fiber is then pulled backward gently until it is seen that the lens has passed at least partially into the front portion 40 of the hole 14. The positioning tool 44 can then be mounted on the contact in the manner shown in FIG. 4, to either push back the lens or to form a stop against which a lens can rest. In the latter case, the rear of the optic fiber 18 is pushed forward in the direction F to abut the tool portion 46. By having the lens abut the tool in the contact, so that the lens is spaced forward of the intersection surface 36, breaking of the lens off the fiber at or near its root is avoided. The optic fiber assembly can then be fixed in place, as with epoxy 50 (FIG. 3), by crimping the contact onto the fiber optic assembly, or by other means. Gentle pushing of the optic fiber, which causes slight compressive loading at the front, is much less likely to damage the optic fiber and its lens than tensile loading caused by pulling the optic fiber while it is resisted from moving back only by force against the root of the lens.

The hole 14 (FIG. 1) of the bushing can be initially formed with a hole diameter M which is sufficiently large to easily receive the optic fiber 18, even with some play. The front of the hole can then be counter bored to enlarge it to form the front portion 40 which has an inside which is more precisely controlled as to diameter, to closely confine the lens, and concentricity with the outside surface 52 of the bushing. It is also possible to form the hole 14 of a diameter that is no more than about 10%, and preferably no more than 5% of the diameter X of the fiber 18 to closely surround the fiber. In this arrangement the lateral position of the lens 28 is established by both the close confinement of the lens in the front hole portion 40 and the close confinement of the fiber in the hole 14.

According to another embodiment of the invention, the entire length of the hole 14 may be made so it is of a uniform diameter, as indicated at 14a in FIG. 5, with the diameter slightly larger than the diameter of the lens 28 to closely surround it.

In the embodiment of the contact 64 shown in FIG. 6, the bushing 66 is mounted within the interior of the ferrule 68 spaced behind the front face 70 of the ferrule, providing an open recess 72 at the front of the contact. The bushing may be a watch jewel, formed of synthetic ruby or sapphire, or it may be a ceramic part. The center bore 74 of the jewel has a diameter closely confining the optic fiber 76 in the same manner as described above in connection with hole 14 and fiber 18. The lens 78 on the end of the fiber is located in the recess 72, but is spaced substantially from the wall of the recess, so that the lens is centered in the ferrule 68 solely by the mounting of the fiber in the watch jewel. It is also possible that the bushing 66 and ferrule 68 could be formed of one-piece, such as machined or formed metal, or molded plastic. The lens 78 is axially positioned in the ferrule 68 by use of the tool 44 in the same manner as described above.

In each embodiment of the invention, the lens at its final position lies forward of the most rearward position it can lie at in the hole. The fact that the lens root 28r is spaced from the intersection surface 36 at the final lens position results in avoidance of thermally induced stress and breakage when the optic fiber 12 and contact 12 expand and contract with temperature changes.

Figure 3:
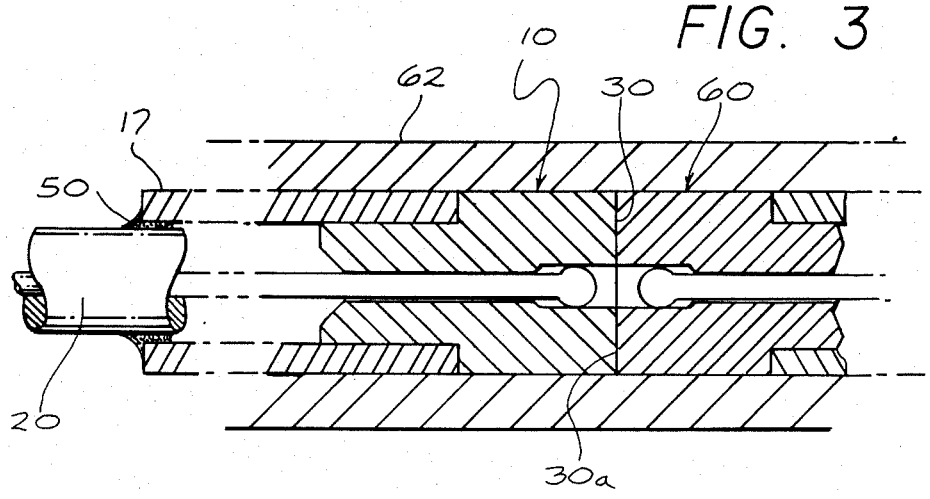
FIG. 3 is a sectional view showing a connection assembly which includes the contact and optic fiber of FIG. 1 and an additional connector and optic fiber.

When the lens has been formed and the optic fiber assembly has been fixed in the contact, the optic fiber contact apparatus 10 can be optically coupled to another contact apparatus 60 as shown in FIG. 3, by placing the two apparatuses in a sleeve 62, with the ends 30, 30A of the apparatuses abutting. Also, a plurality of contacts similar to contact 12 may be combined to form a connector for coupling a plurality of optic fibers. The optic fiber may be coupled to several different types of optical devices, including another optic fiber, a light source, or a photodetector.

Accurate bead formation has been found possible by electric arc heating which requires an arc to pass near the optic fiber tip portion. Where the bushing 26 is formed of metal, such as stainless steel, which can be formed at relatively low cost and provide great ruggedness, it is desirable that the tip of the optic fiber lie a sufficient distance forward of the bushing front end 30, to avoid the possibility that the electric arc between the electrodes 32, 34 will pass through the bushing.

Thus, the invention provides an optic fiber connection apparatus and method for constructing it, which enables close positioning of the lens of an optic fiber in both lateral and axial directions, without the need to pull the fiber so the root of the lens bears firmly against a seating surface or to leave it at such a position. This is accomplished by using a contact with a hole of substantially constant cross section and with an inside width or diameter that closely surrounds the fiber or the lens, or both, to closely fix the lateral position of the lens. The position of the lens along the axis spaced from the intersection surface 36 is accurately established by a positioning tool. Further, by the use of the tool 44 to locate the lens in the contact, two manufacturing tolerances inherent in the prior art contact are eliminated, thereby assuring a more precise positioning of the front face of the lens in the contact so that light transmission through mating contacts will be maximized.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for mounting an optic fiber having a first diameter along most of its length and having a front end with a lens of a second diameter that is larger than said first diameter comprising:

a contact having front and rear ends and having an elongated hole extending between said ends, said hole having front and rearward portions, said front portion of said hole having a diameter greater than that of said rearward portion of said holes, said hole providing a forwardly facing shoulder between said rearward and forward hole portions;

said rearward portion of said hole having a diameter larger than said first diameter but smaller than said second diameter, said rearward portion of said hole having a diameter slightly larger than said first diameter to closely surround said fiber to maintain the lateral position of said lens in a direction perpendicular to the length of said hole while allowing the fiber and lens to slide along said hole, said forward portion of said hole extending to said front end of said contact; and positioning tool means having a lens-engaging portion which fits onto said front hole portion from said front end of said contact, and having abutting portion which abuts said front end of said contact, the distance between said shoulder and said lens-engaging portion of said tool means when said contact abutting portion abuts said front end of said contact being greater than the axis extent of said lens whereby when said lens-engaging portion engages said lens in said contact, said lens will be spaced forward of said shoulder.

2. A method for mounting an optic fiber in a contact having a hole extending therethrough with the hole having a forwardly facing shoulder spaced behind the front end of the contact, comprising the steps of:

extending an optic fiber through said hole from the rear of said contact until the front end of the fiber projects beyond the front end of said contact;

heating said projecting front end of said fiber to form a lens thereon in front of said contact;

sliding said fiber rearwardly in said hole to locate said lens in said hole in front of said shoulder; and moving said fiber along said hole so that said lens lies at a final position which is a predetermined distance behind said front end of said contact, said lens at said final position being spaced forward of said shoulder to provide a gap between the rear of said lens and said shoulder.

3. The method as described in claim 2 including:

placing a lens-positioning tool so a lens-engaging portion thereof lies in said hole and a contact abutting portion thereof abuts the front end of said contact;

said step of moving said fiber comprises urging said fiber in a forward direction until said lens lies at said final position at which it engages said lens-engaging portion of said tool.

4. The method described in claim 2 wherein said step of moving said fiber comprises:

pushing said lens by use of a tool inserted into said hole from said front end of said contact until said lens lies at said final position.

5. Optic fiber connection apparatus comprising:

a contact having front and rear ends and an axis extending between said ends, said contact having a hole extending along said axis, said hole having front and rearward portions;

an optic fiber extending forwardly through said hole from said rear end of said contact into said front hole portion, said optic fiber having a front end with an enlargement forming a lens thereon;

said front portion of said hole having a diameter greater than that of said rearward portion of said hole, said front and rearward hole portions being joined by an intersection surface;

the diameter of at least one of said front and rearward portions of said hole being such as to closely confine the fiber therein to maintain said lens on said axis despite axial movement of the lens along said front hole portion; and positioning tool means having a lens-engaging portion which fits into said front hole portion from said front end of the contact, and having a contact abutting portion which abuts said front end of said contact, the distance between said intersection surface and said lens-engaging portion of said tool means when said contact abutting portion abuts said front end of said contact being greater than the axial extent of said lens whereby when said lens-engaging portion engages said lens in said contact, said lens will be spaced forward of said intersection surface.

6. An optic fiber connection apparatus as set forth in claim 5 wherein:
   the distance between said lens-engaging portion and said contact abutting portion of said tool means is a precise predetermined distance for accurately locating the front face of said lens at a position behind said front end of said contact whereby light transmission between a mating pair of said contacts will be maximized.

\* \* \* \* \*